(12) United States Patent
Wandura et al.

(10) Patent No.: US 12,269,198 B2
(45) Date of Patent: Apr. 8, 2025

(54) HANDLING DEVICE, REMOVAL STATION, AND METHOD FOR HANDLING TUBULAR OR ELONGATE BOWL-SHAPED WORKPIECES

(71) Applicant: MA micro automation GmbH, St. Leon-Rot (DE)

(72) Inventors: Roland Wandura, Limburgerhof (DE); Andreas Betz, Limburgerhof (DE)

(73) Assignee: MA micro automation GmbH, St. Leon-Rot (DE)

( * ) Notice: Subject to any disclaimer, the term of this patent is extended or adjusted under 35 U.S.C. 154(b) by 30 days.

(21) Appl. No.: 17/773,348

(22) PCT Filed: Oct. 30, 2020

(86) PCT No.: PCT/EP2020/080562
§ 371 (c)(1),
(2) Date: Jul. 29, 2022

(87) PCT Pub. No.: WO2021/084094
PCT Pub. Date: May 6, 2021

(65) Prior Publication Data
US 2024/0149509 A1   May 9, 2024

(30) Foreign Application Priority Data

Oct. 30, 2019 (DE) .................... 10 2019 129 329.4

(51) Int. Cl.
*B29C 45/42* (2006.01)
*B29C 45/17* (2006.01)
(Continued)

(52) U.S. Cl.
CPC ...... *B29C 45/1769* (2013.01); *B29C 45/4225* (2013.01); *B29C 45/7686* (2013.01); *B29C 2045/4233* (2013.01); *B29L 2031/712* (2013.01)

(58) Field of Classification Search
CPC ............ B29C 45/1769; B29C 45/4225; B29C 45/7686; B29C 2045/4233; B29C 2045/4241; B29C 45/42; B29L 2031/712
(Continued)

(56) References Cited

U.S. PATENT DOCUMENTS

| 6,190,157 B1 | 2/2001 | Hofstetter et al. |
| 2013/0015108 A1 | 1/2013 | Krauss et al. |
| 2019/0168434 A1 | 6/2019 | Kubalek et al. |

FOREIGN PATENT DOCUMENTS

| DE | 20 2017 104 004.6 U1 | 11/2018 |
| EP | 0 982 113 A2 | 3/2000 |

(Continued)

OTHER PUBLICATIONS

European Patent Office, International Search Report for PCT App. No. PCT/EP2020/080562, Mar. 30, 2021, pp. 1-7.

(Continued)

*Primary Examiner* — Lynn E Schwenning
(74) *Attorney, Agent, or Firm* — Cahn & Samuels, LLP

(57) ABSTRACT

A handling device (1) for tubular or elongate bowl-shaped workpieces such as pipette tips (4) or cups, said workpieces preferably being transported or being able to be transported on a workpiece carrier (T) during the production of said workpieces until packaging, the workpiece carrier (T) having receiving places (5) for the workpieces, which receiving places are arranged in a grid relative to each other, preferably with the stipulation that faulty workpieces located on the workpiece carrier (T) can be detected, and preferably (Continued)

Figure 1:
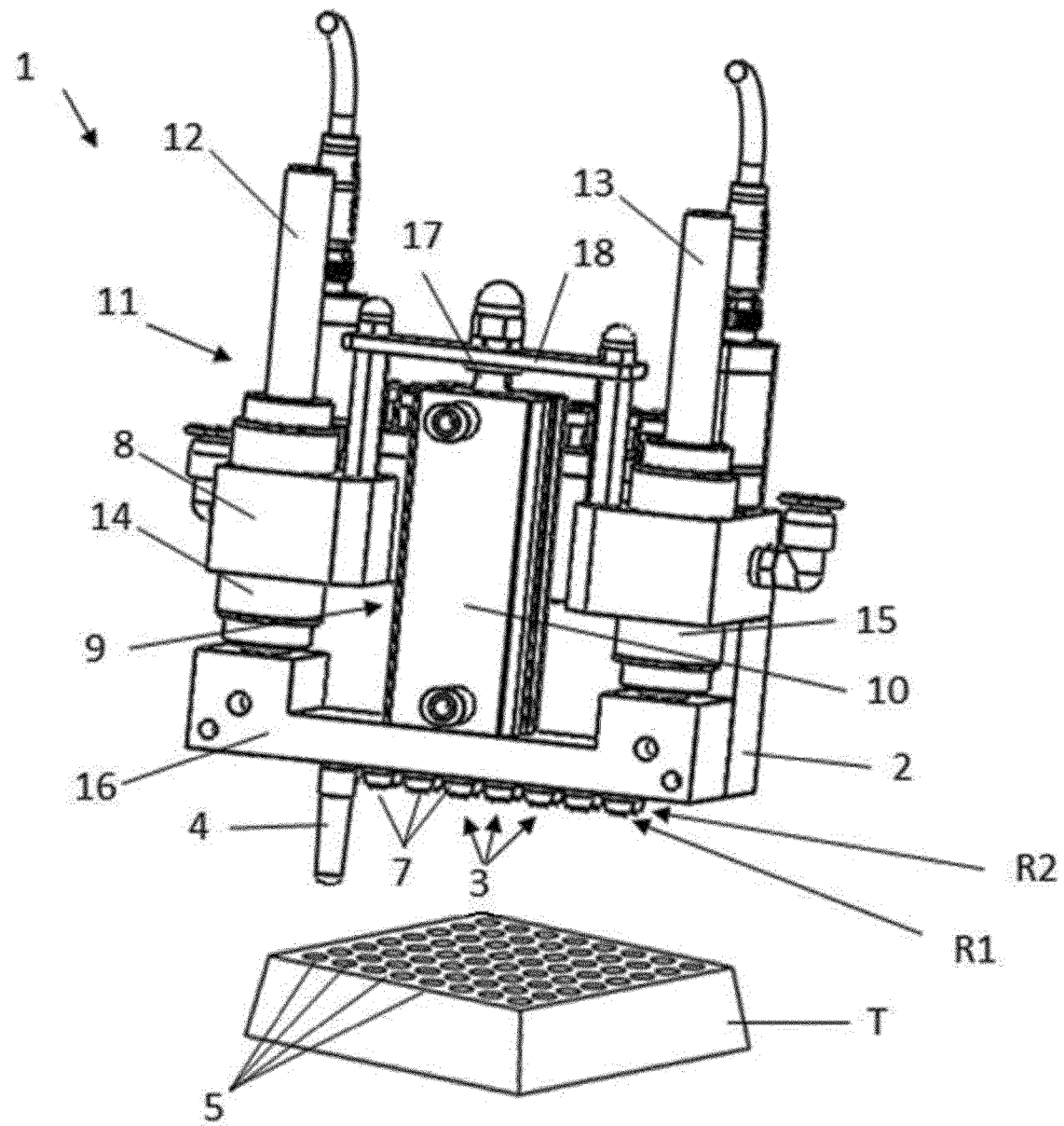

with the stipulation that a removal station (25) is provided, by means of which the faulty workpieces can be removed from the receiving places (5) of a workpiece carrier (T), receiving places (5) thus being freed up, freed-up receiving places (5) of the workpiece carrier (T) being able to be loaded with faultless workpieces by means of the handling device, the handling device comprising a refill magazine (2), which has magazine places (3) arranged next to each other, each magazine place having a holding element (7) that can be moved up and down and that is used to secure and to receive and release a faultless workpiece, with the additional stipulation that each magazine place (3) comprises a guide tube (6), in which the up and down movement of the holding element (7) occurs, the holding element (7) being able to be moved, together with a secured workpiece, into the guide tube (6), and that an acceleration apparatus (V) is provided, by means of which the workpiece can be accelerated out of the guide tube (6) and can be moved to a receiving place (5) of the workpiece carrier (T).

14 Claims, 6 Drawing Sheets

(51) Int. Cl.
    *B29C 45/76*     (2006.01)
    *B29L 31/00*     (2006.01)

(58) Field of Classification Search
    USPC .......................................................... 414/763
    See application file for complete search history.

(56) References Cited

FOREIGN PATENT DOCUMENTS

| | | |
|---|---|---|
| EP | 2 499 501 B1 | 7/2013 |
| WO | 97/47459 A1 | 12/1997 |
| WO | 2017/031589 A1 | 3/2017 |
| WO | 2018/036857 A1 | 3/2018 |
| WO | 2018/072009 A1 | 4/2018 |
| WO | 2019/008100 A1 | 1/2019 |

OTHER PUBLICATIONS

European Patent Office, International Search Report for PCT App. No. PCT/EP2020/080562, Mar. 30, 2021, pp. 1-8.
The International Bureau of WIPO, International Preliminary Report on Patentability for PCT App. No. PCT/EP2020/080562, Jan. 28, 2022, pp. 1-32.

HANDLING DEVICE, REMOVAL STATION, AND METHOD FOR HANDLING TUBULAR OR ELONGATE BOWL-SHAPED WORKPIECES

The invention relates to a handling device for tubular or elongate bowl-shaped workpieces such as pipette tips or beakers, wherein it is optionally provided that these workpieces are conveyed or conveyable on a workpiece carrier during their production up until packaging, wherein the workpiece carrier has receiving spaces arranged in a grid relative to one another, preferably with the proviso that defective workpieces located on the workpiece carrier are detectable, wherein a removal station can be or is provided, with which the defective workpieces can be removed from the receiving spaces of a workpiece carrier, such that receiving spaces are vacated, wherein vacated receiving spaces of the workpiece carrier can be loaded with defect-free workpieces using the handling device.

The handling device serves the purpose of directly removing defective workpieces from a workpiece carrier and filling the resultant gaps, i.e. the vacated receiving spaces, with defect-free "good workpieces". This is intended to avoid difficulties in subsequent processing steps at downstream stations. It is known to be necessary to slow down or even stop conveying of the workpiece carrier for the time taken to inspect or extract the defective workpieces. This is in particular problematic if it takes a relatively long time to inspect or remove the defective workpieces.

WO2017031589 A1 discloses a cooling plate assembly including (a) a cooling plate having a plate front surface; (b) an air channel extending within the thickness of the cooling plate; (c) a plate bore extending into the cooling plate from the plate front surface for producing fluid communication between the air channel and a cavity of a cooling tube mountable to the cooling plate; and (d) a valve within the plate bore. The valve is movable between a first position in which a first air flow passage extending within the plate bore is open for conducting air from the cavity to the air channel, and a second position in which the first air flow passage is obstructed to reduce air flow between the cavity and the air channel, and in which a second air flow passage extending within the plate bore is open for conducting air from the air channel to the air channel.

WO9747459 A1 relates to an ejector device for a removal device suitable for removing preforms, with which partially cooled preforms can be removed from a mold tool and, after complete cooling thereof, they can likewise be safely and completely ejected again from the removal device.

WO2018036857 A1 proposes carrying out optical inspection of preforms, which is to be carried out using at least one camera device in such a way that the preforms are in an unchanged relative position to one another compared to an injection molding process.

WO2018072009 A1 discloses to a person skilled in the art a molding system comprising an inspection apparatus. The molding system comprises a molding machine for producing multilayer preforms having a core layer and a skin layer enveloping the core layer, a triage device configured to determine, for a portion of the multilayer preforms, at least one preform parameter, and to select at least one preform for inspection based at least in part on the preform parameter; and an inspection device configured to receive the selected multilayer preforms and to determine at least one attribute of the at least one of the plurality of multilayer preforms.

The object of the present invention is to improve a handling device for tubular or elongate bowl-shaped workpieces with regard to the speed of handling of defect-free workpieces when filling vacated receiving spaces of a workpiece carrier and, if a removal station is included, likewise to improve the speed of handling of defective workpieces which have to be removed from a workpiece carrier. A further object of the invention is to provide a correspondingly improved method for handling corresponding workpieces.

This object is achieved by a handling device according to claim 1, a removal station according to claim 11 and a method according to claim 14. The subclaims state advantageous embodiments.

According to the invention, the handling device comprises a refill magazine which has magazine spaces arranged adjacent one another, each with a holding element which can be moved up and down and serves to firmly hold and to receive and deliver a defect-free workpiece in each case, with the further proviso that each magazine space comprises a guide tube in which the upward and downward movement of the holding element takes place, wherein the holding element together with a firmly held workpiece can be moved at least in part into the guide tube and that an acceleration device is provided, with which the workpiece can be accelerated out of the guide tube and can be moved to a receiving space of the workpiece carrier. Using the handling device according to the invention, vacated receiving spaces of the workpiece carrier can be particularly quickly and reliably loaded with defect-free workpieces. The particularly short loading time with defect-free workpieces and/or the particularly short removal time of defective workpieces using the removal station according to the invention mean that workpiece conveying need only be briefly interrupted or only comparatively slightly, or hardly at all, slowed down at the handling device and/or removal station. Furthermore, the workpiece can as a result be arranged particularly accurately in its receiving space, such that it preferably immediately assumes its nominal position on the workpiece carrier, and preferably also its desired spatial orientation thereon. As a result, the entire production line with integrated manufacturing device for the workpieces, which may also comprise an inspection device for inspecting the workpieces for freedom from defects and/or a packaging station for the workpieces, and in which workpieces are continuously conveyed between the devices or stations, can be operated at a high production speed.

The refill magazine is advantageously mobile relative to the workpiece carrier, such that each magazine space of the refill magazine can be brought into congruence with each vacated receiving space of the workpiece carrier. In this way, each magazine space which has not yet delivered the defect-free workpiece can be brought into congruence with each of the vacated receiving spaces, in order to fill the corresponding receiving space with a defect-free workpiece. This enables rapid loading of the workpiece carrier with defect-free workpieces. Furthermore, the handling device is consequently particularly adapted to load different workpiece carriers with different grid arrangements of workpieces.

The gaps left by vacated receiving spaces can advantageously be directly and quickly filled with the proposed handling device. The refill magazine, which brings a magazine space into congruence with a vacated receiving space, can move just as quickly and precisely as transfer of a defect-free workpiece out of the magazine space and into a free receiving space of a workpiece carrier.

The handling device preferably comprises a workpiece carrier, with workpieces, wherein the workpieces can be handled using the handling device according to the invention. The handling device without such a workpiece carrier is, however, independently provided by the present invention. These workpieces are preferably conveyable or conveyed on a workpiece carrier during their production up until packaging, for which purpose a corresponding conveying device may be jointly provided with the handling device, but the invention also provides the handling device independently of the conveying device. The workpiece carrier has workpiece receiving spaces arranged in a grid relative to one another.

Any defective workpieces located on the workpiece carrier are preferably detectable. A suitable detection device may be provided for this purpose, which may be provided by workpieces positioned on the workpiece carrier, which are preferably located in their nominal position with regard to conveying of the workpiece carrier. The detection device may be part of the handling device, preferably the invention provides the handling device independently of such a detection device. The workpieces are thus arranged on the workpiece carrier in such a way as to enable defect detection using the detection device, i.e. preferably suitably spaced apart from one another and arranged in a suitable, preferably predefined spatial position to one another.

A removal station is preferably provided, with which the defective workpieces can be removed from the receiving spaces of a workpiece carrier, such that receiving locations are vacated, wherein vacated receiving spaces of the workpiece carrier can be loaded with defect-free workpieces using the handling device.

The handling device may include the stated removal station or is configured without the latter and then only serves to receive defect-free workpieces, namely from a suitable supply, and then to fill emptied receiving spaces of a workpiece carrier with them. The removal station is moreover considered to be an independent invention with which defective workpieces are removable from the receiving spaces of a workpiece carrier.

The workpieces to be handled with the proposed handling device are in particular pipette tips and matching beakers. End users normally make use of pipette tips and beakers in pairs. They are used, for example, in laboratories for investigating medical or other test samples. Workpieces of the initially stated type are often made of plastics, for example by injection molding. Manufacturing defects may occur, which have to be monitored. Individual defective workpieces must be detected on a workpiece carrier so that they can be removed and replaced with defect-free workpieces.

The proposed handling device is set up so to speak to shoot a defect-free workpiece out from the guide tube of a refill magazine. For this purpose, the guide tube acts like a gun barrel out of which the workpiece is accelerated. The guide tube therefore has a cross-section which is adapted to the cross-section of the workpiece which can be received therein and is to be accelerated out therefrom. The guide tube imparts a sufficiently straight movement path to the workpiece. This entails a certain length of guidance within the guide tube. For this purpose, the workpiece is at least partially raised up into the guide tube. If necessary, it can be moved completely into the guide tube. The entire length of the guide tube is conveniently utilized to bring about acceleration of the workpiece within the guide tube. The length of the guide tube is dimensioned in such a way that the workpiece reaches the receiving space of the workpiece carrier with sufficient precision or with sufficient accuracy. In this way, the workpiece is preferably mechanically decoupled from the acceleration device when the workpiece assumes its position in the receiving space on the workpiece carrier, which enables particularly rapid operation of the handling device. At the point in time at which the workpiece leaves or is decoupled from the acceleration device, the workpiece is preferably for example spatially or vertically spaced from its receiving space on the workpiece carrier.

Receiving spaces for workpieces are conventionally arranged on a workpiece carrier in a grid, for example in a plurality of parallel rows. The receiving spaces may be the same distance apart within a row as the rows are apart from one another. The receiving spaces of adjacent rows may furthermore be arranged without an offset from one another and so form a square grid.

Provided the refill magazine has at least two rows of magazine spaces, the magazine spaces of the refill magazine may also be arranged in a grid and this grid conveniently coincides with the grid of the workpiece carrier. This allows the refilling device to be positioned above the workpiece carrier in such a way that the magazine spaces are exactly congruent with the receiving spaces. Each magazine space is accordingly capable of loading a congruent receiving space with a workpiece.

The acceleration device is in each case conveniently provided with a spring pressure element or a compressed air nozzle, such that when the holding element is moved into the guide tube a force pulse can be transferred onto the workpiece by the acceleration device. This improves the speed of workpiece handling by using the guide tube in the manner of a gun barrel, to guide the workpiece like a bullet when the force pulse accelerates it out of the guide tube. The configuration of the acceleration device with a pressure nozzle is particularly advantageous since it is particularly wear-free, easily adaptable to specific requirements, such as the characteristics of the respective workpiece, and for example particularly suitable for clean room conditions.

The individual magazine spaces therefore hold the defect-free workpieces in guide tubes. The acceleration device of each magazine space can be individually actuated by a control device. In this way, workpieces can be shot out of individual magazine spaces as required. A plurality of magazine spaces can also be actuated simultaneously, if they are simultaneously in congruence with empty receiving spaces of the workpiece carrier.

The control device further serves to control the stated mobility of the refill magazine relative to the workpiece carrier such that a loaded magazine space, the guide tube of which is occupied by a defect-free workpiece, can be brought into congruence with an empty receiving space of the workpiece carrier. Once this congruence has been established, the defect-free workpiece can be shot out of the guide tube in order to load the empty receiving space of the workpiece carrier therewith. The refill magazine may preferably be moved such that each magazine space can be brought into congruence with each of the receiving spaces of the workpiece carrier. In this way, it is possible to empty all the magazine spaces of the refill magazine.

In simple manner, a compressed air supply together with a pneumatic switching valve are provided in order to impart momentum to the workpiece by way of a compressed air pulse. The switching valve increases the speed by operating quickly and precisely, it preferably being possible to provide a rapid switching valve. To this end, it is briefly opened, so admitting compressed air into the guide tube. In the guide tube, the compressed air expands and the expanded air drives and propels the workpiece out of the guide tube. This enables particularly wear-free operation and is particularly suitable for clean room conditions.

It is of further benefit for each raisable and lowerable holding element to be provided with an additional suction nozzle with which the refill magazine can be reliably loaded with defect-free workpieces. The suction nozzles conveniently remain permanently switched on. Even when a compressed air nozzle releases a pressure pulse to deliver a defect-free workpiece, the suction nozzle remains permanently in operation. The pressure pulse should be set sufficiently strong to accelerate a defect-free workpiece out of the corresponding magazine space of the refill magazine against the suction effect of the suction nozzle. This enables particularly fast and reliable operation and low-wear design of the device, which is also particularly suitable, for example, for clean room conditions.

The suction nozzles of a plurality of the raisable and lowerable holding elements are conveniently connected via a common suction line, which may also be denoted a common rail system. It simplifies the mechanical complexity and, once the refill magazine has been completely emptied, makes it possible to reload all the magazine spaces simultaneously with new defect-free workpieces. The defect-free workpieces for this purpose come from a suitable supply, in which they are kept in a grid arrangement corresponding to the grid of the refill magazine. In this way, all the magazine spaces can be simultaneously and directly reloaded without there being any need to move the refill magazine to and for reloading.

More simply, the compressed air nozzle and the suction nozzle are each arranged coaxially on the respective raisable and lowerable holding element. This symmetrical structure improves the precision and accurate delivery of defect-free workpieces which in this way reliably reach vacated receiving spaces of a workpiece carrier. The coaxial design moreover permits a very compact structure and simplifies manufacture. The compressed air nozzle is advantageously arranged centrally and coaxially, to which end the suction nozzle can be arranged annularly around the pressure nozzle. A reverse arrangement with the suction nozzle arranged centrally and the pressure nozzle annularly around the suction nozzle is, however, also possible in principle. The first-stated arrangement with the central compressed air nozzle is, however, less complex, and advantageous, among other things, because the cross-section of the suction nozzle should be greater than the cross-section of the pressure nozzle in order to generate a sufficient suction flow. A suction nozzle with a larger cross-section is simple to produce in annular form. The first-stated arrangement is therefore easier to implement in mechanical engineering terms. The larger cross-sectional area of the annular suction nozzle permits a higher volumetric flow rate. This is convenient, among other things, because the intention is to use a negative pressure which has been reduced as little as possible relative to the air pressure of the surrounding atmosphere and amounts to approx. 500-800 mbar, preferably 700 to at most 800 mbar to be on the safe side. An overpressure of 3-10 bar, preferably of 4-8 bar and particularly preferably of 6 bar relative to the air pressure of the surrounding atmosphere is provided for the compressed air nozzle pressure pulse. In addition, a common suction connection for all the suction nozzles is easy to implement with just one common suction line arranged transversely of the suction nozzles which is connected to all the suction nozzles. The pressure ducts, on the other hand, are all individually driven so as to be able to deliver individual pressure pulses.

A further benefit is obtained if a lifting device with which at least one of the raisable and lowerable holding elements can be moved upward and downward is provided. This measure means that there is no need for the refill magazine to be moved up and down as a whole. It reduces the mass which has to be moved in order to receive a defect-free workpiece into the refill magazine and to deliver it therefrom.

It is particularly beneficial for the lifting device to have a raisable and lowerable coupling element, wherein a plurality or all of the raisable and lowerable holding elements are connected to the coupling element. In this way, the holding elements of all the magazine spaces of the refill magazine can be jointly actuated, i.e. raised and lowered, with a single lifting device, such that in this way a plurality of holding elements are integrated and are raisable and lowerable using a common coupling element.

A further improvement is obtained if the lifting device provides a lifting guide for the raisable and lowerable coupling element together with a lifting cylinder for driving the raising and lowering movement of the coupling element. The drive of the raisable and lowerable holding elements is improved by integrating a lifting device for actuating a plurality or all of the holding elements therewith.

A control device is furthermore helpfully provided via which the common suction line for the suction nozzles can be switched on when the coupling element assumes a lowered position, wherein the compressed air nozzles are also individually actuatable using the control device. Compressed air nozzles are conveniently actuated when the coupling element is in a raised position. This allows the workpiece to be moved sufficient deep into the guide tube. In this way, the holding element improves loading of the guide tubes. Each workpiece is stored and protected in the guide tube. The storage position of the workpiece is either so deep in the guide tube that it can be shot directly out of the storage position or the workpiece is moved into a suitable shooting position before the shot, i.e. before the force pulse imparted by the compressed air pulse.

Each guide tube can be unloaded and the workpiece shot out independently of all the other guide tubes by a compressed air pulse, so permitting a particularly flexible mode of operation.

The handling device is particularly efficient not least because it comprises a removal station which operates independently of the refill magazine and is upstream thereof. If the refill magazine is used, the defective workpieces have already been removed from the workpiece carrier. The sole purpose of the refill magazine is to receive and store defect-free workpieces and to selectively introduce them into empty receiving spaces of a workpiece carrier.

A removal station for the initially mentioned defective workpieces such as for example pipette tips or beakers is furthermore proposed. The removal station comprises a lifting aid for lifting the defective workpieces out of the workpiece carrier and comprises a disposal line for conveying away the defective workpieces which have been lifted out, wherein a passage region for the workpiece carrier is provided between the disposal line and the lifting aid.

If a workpiece carrier can enter the passage region of the removal station, conveying of the workpiece carrier then advantageously need not be stopped in order for it to be possible to lift out a defective workpiece. The lifting aid can impart a pulse which lifts the workpiece out while the workpiece carrier is passing by the passage region of the removal station. There is no necessity to reduce the conveying speed of the workpiece carrier. However, it is of course possible to set a reduced conveying speed for when the workpiece carrier is passing by the passage region or even to stop it in order to lift out defective workpieces.

The position of a defective workpiece can be determined with a suitable detector. The detector supplies the control device with a position signal which identifies the relevant receiving space of the workpiece carrier in which the detected defective workpiece is located. By evaluating this position signal, the control device can trigger the lifting aid which lifts the defective workpiece out of the receiving space of the workpiece carrier.

The lifting aid of the removal station conveniently comprises at least one compressed air nozzle with which a defective workpiece can be lifted out of the receiving space of the workpiece carrier using a compressed air pulse. Furthermore and irrespective of whether the lifting aid is a compressed air nozzle, it is possible to generate in the disposal line a negative pressure relative to the air pressure of the surrounding atmosphere. In this way, the lifted out defective workpiece can be sucked into the disposal line and conveyed away thereby. This enables a particularly rapid, precise and low-wear mode of operation. If compressed air is not to be used, a mechanical plunger can, for example, be provided as an alternative for lifting out a defective workpiece.

More simply, it is possible to provide a plurality of compressed air nozzles in a row together with a plurality of disposal lines in a row. The compressed air nozzles are located opposite the disposal lines, each compressed air nozzle being in alignment with a disposal line. This allows a plurality of workpieces to be removed simultaneously using the removal station. Furthermore or alternatively, the approach movement of the individual workpiece positions on the workpiece carrier for the extraction of defective workpieces is substantially facilitated.

The row of compressed air nozzles and the row of disposal lines conveniently extend transversely of the throughflow direction of the workpiece carrier. In this way, each individual receiving space which passes through the passage region can be selectively driven over the entire width of the passage region should a defective workpiece be located there, in order if necessary to generate a lifting pulse there which lifts the defective workpiece out from the receiving space. If necessary, a plurality of rows of compressed air nozzles and disposal lines can be provided in order to lift out and dispose of defective workpieces in two rows.

The invention further relates to a handling device according to the invention with a removal station described according to the invention.

The invention further relates to a method for handling tubular or elongate bowl-shaped workpieces using a handling device as described in this disclosure and/or using a removal station as described in this disclosure for handling the workpieces.

Figure 2:
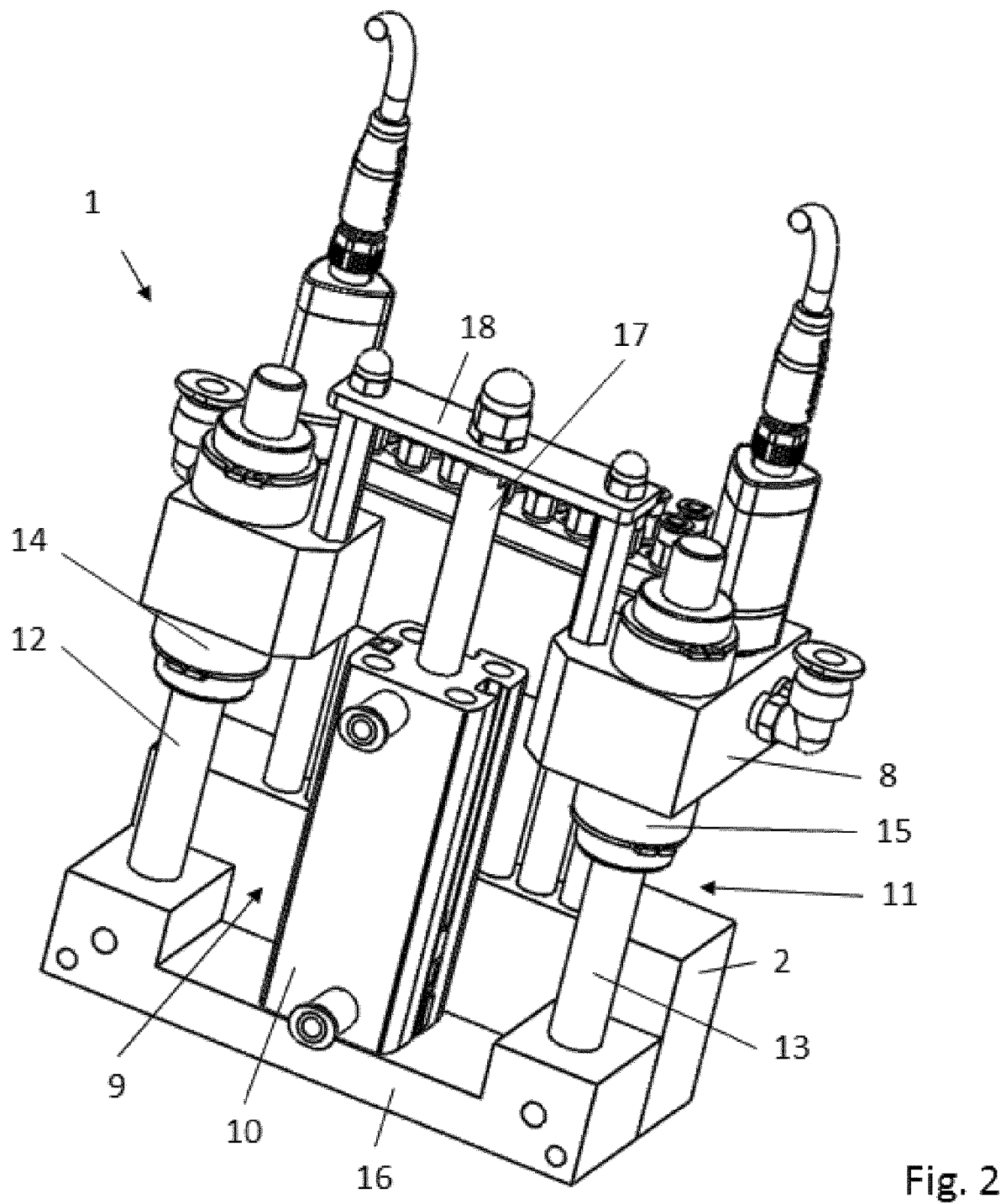
Figure 3:
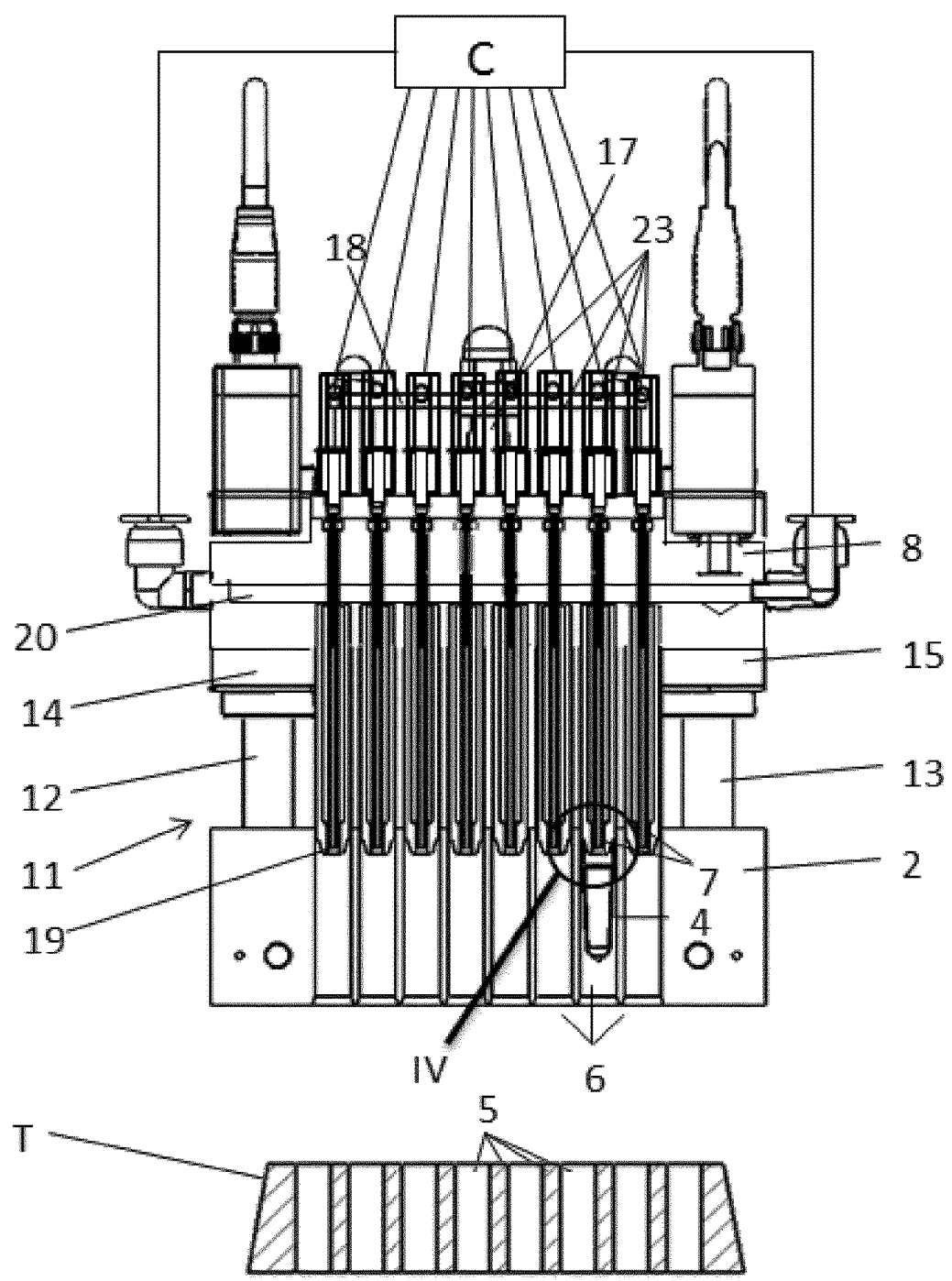
Figure 4:
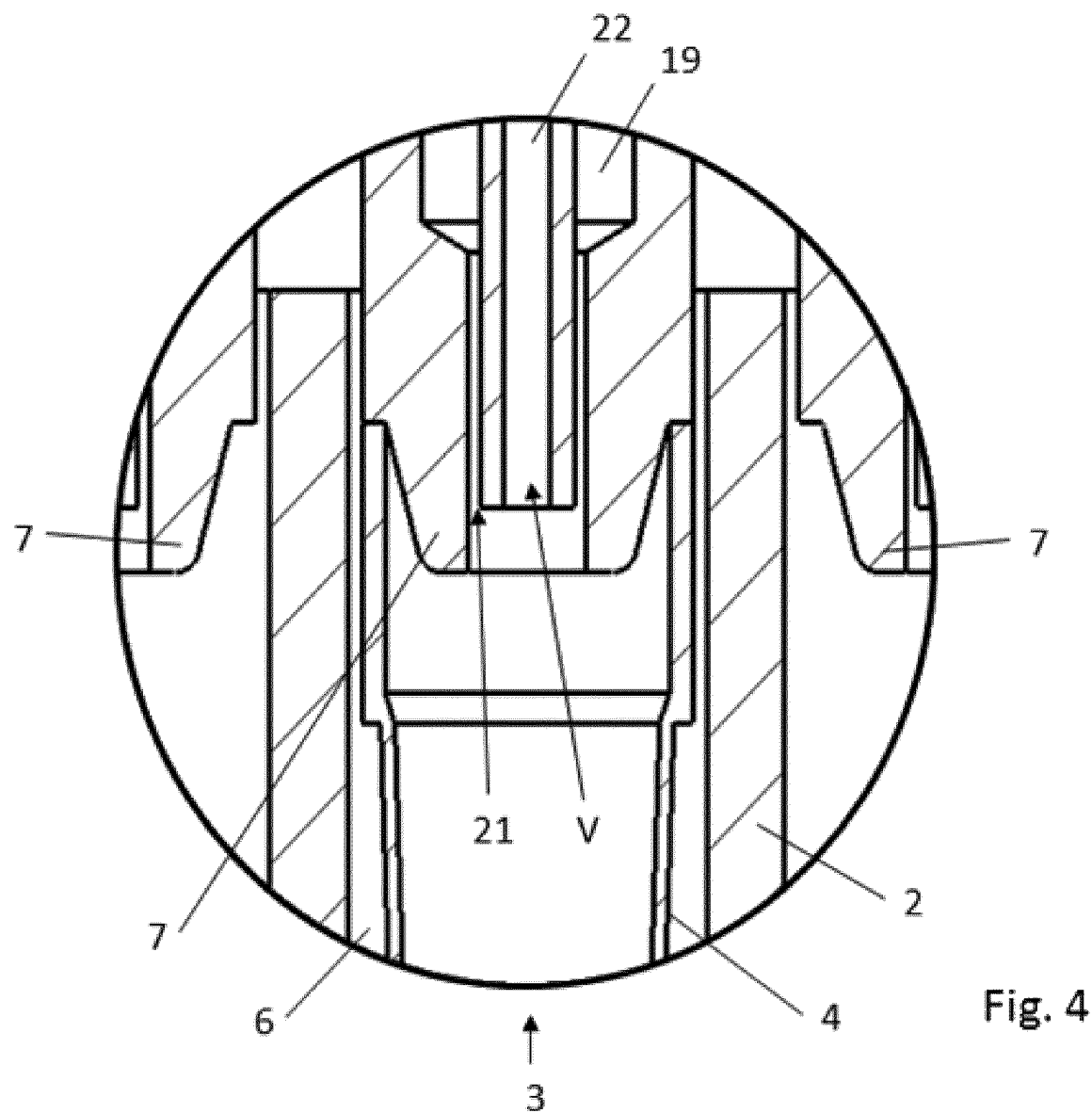
Figure 5:
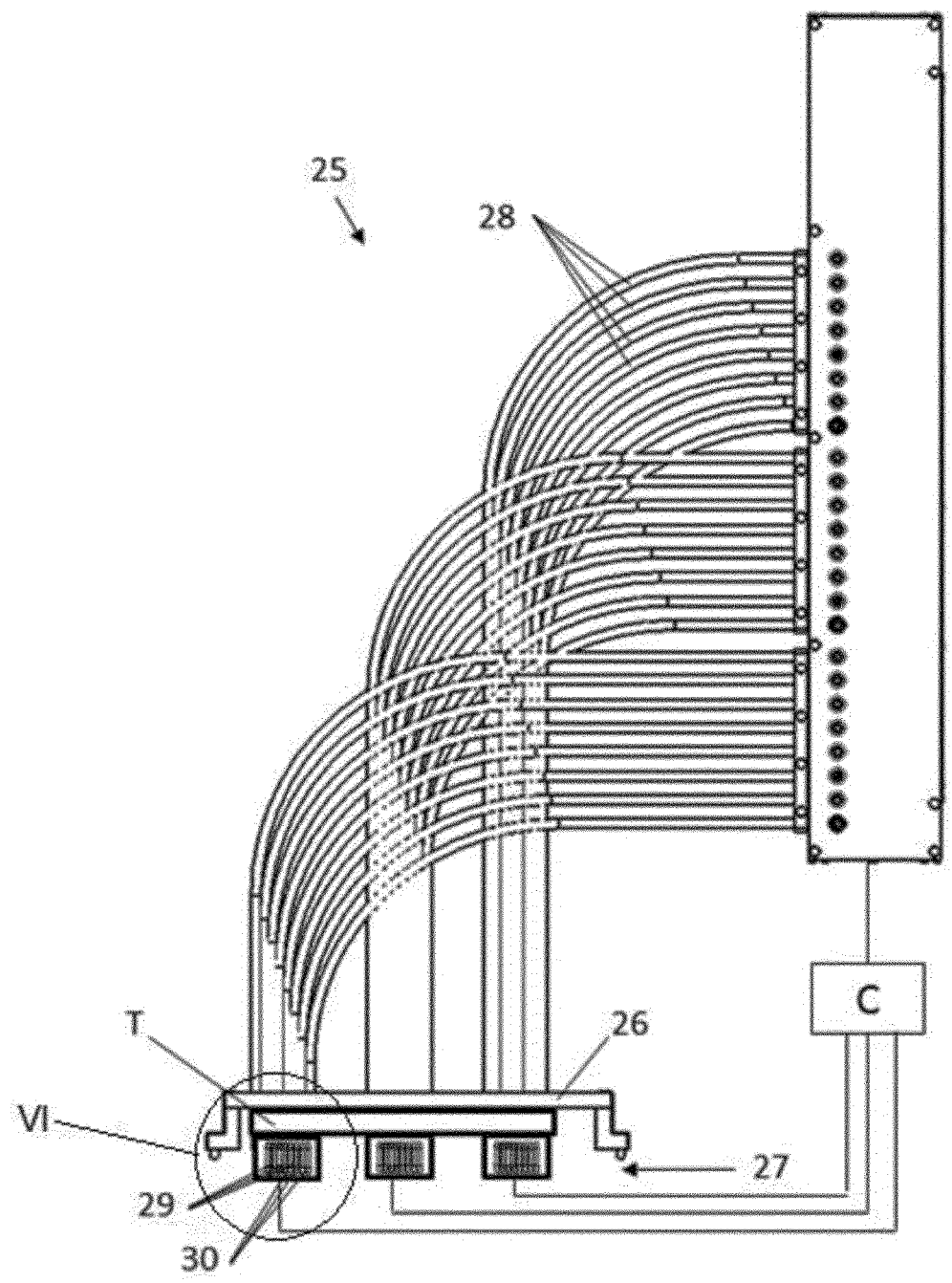
Figure 6:
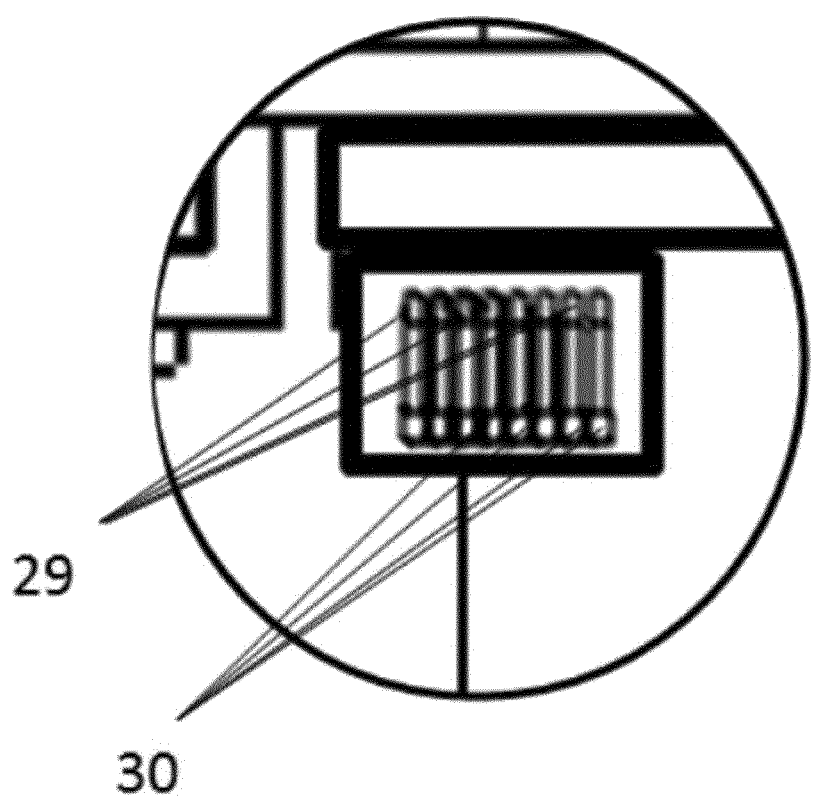

The invention is illustrated below by way of example in drawings and described in detail with reference to several figures, in which:

FIG. 1 shows a part of the handling device according to the invention without its removal station, wherein the raisable and lowerable holding elements are in the lowered state (loading position), FIG. 2 shows the handling device according to FIG. 1 with the holding elements in the upwardly moved state (storage position), FIG. 3 shows a sectional representation of the handling device in the storage position according to FIG. 2 and above a workpiece carrier, FIG. 4 shows a magnified portion according to IV in FIG. 3, FIG. 5 shows a removal station, FIG. 6 shows a magnified portion according to VI in FIG. 5.

FIG. 1 shows part of a handling device according to the invention, specifically the part provided for receiving and storing defect-free workpieces. It has for this purpose a refill magazine 2 with a plurality of magazine spaces 3 for the individual workpieces. The proposed handling device is provided for tubular or elongate bowl-shaped workpieces, such as a pipette tip or a beaker for a pipette tip. FIG. 1 shows one pipette tip 4 by way of example.

FIG. 1 further shows a workpiece carrier T which has receiving spaces 5 for individual pipette tips. The receiving spaces are arranged in an 8×8 grid.

FIG. 1 depicts the handling device in a loading position in which a pipette tip can be gripped, as is apparent from the depicted pipette tip 4. During operation, all the free magazine spaces 3 are conveniently simultaneously loaded with defect-free pipette tips.

The refill magazine 2 is further provided for delivering the defect-free pipette tips, namely in order to complete loading of the receiving spaces 5 of the workpiece carrier T if defective pipette tips have previously had to be removed from their receiving spaces 5. Defect-free pipette tips 4 are transferred from the refill magazine 2 to the vacated receiving spaces 5 and thereby complete loading of the workpiece carrier T. An acceleration device V, which accelerates the pipette tips 4 out of a storage position in the refill magazine 2, is provided to transfer the pipette tips from the refill magazine.

Manufacturing defects occur time and again in the production of workpieces such as pipette tips, including when they are produced by injection molding. Wear phenomena can, for example, arise on the injection mold. An elevated defect rate then results in more defective workpieces/pipette tips, which initially end up on the workpiece carrier and subsequently have to be removed again. The ongoing injection molding method cannot always be stopped immediately to repair the injection mold. Instead, production must sometimes continue and defective workpieces must subsequently be removed in the further course of production and replaced with defect-free workpieces. The workpiece carriers T are packaged over the course of production and reach customers packaged in this way. It is therefore unacceptable to leave receiving spaces empty when defective workpieces have been removed.

An efficient handling device which is capable of replacing the defective workpieces in a workpiece carrier with defect-free workpieces is therefore of great advantage.

FIG. 1 does not show that part of the handling device which removes the defective workpieces from the workpiece carrier T. For the purposes of the present invention, this part is denoted removal station. An exemplary embodiment of the removal station is described below with reference to FIG. 5.

First, however, FIG. 1 shows the already mentioned refill magazine 2 which, in the present example has two adjacent rows R1 and R2 each with eight magazine spaces 3 per row. Each magazine space 3 comprises a guide tube 6 and, therein, a respective holding element 7 which can be moved up and down and which, in the present embodiment, is arranged for initially gripping and firmly holding pipette tips 4. The refill magazine 2 can in this way be loaded with defect-free pipette tips 4. An empty receiving space 5 of a workpiece carrier T can then be reloaded from this refill supply and this can be repeated until all the magazine spaces 3 are empty. All the magazine spaces of the refill magazine 2 are then reloaded at once in order to be able to repeat the process and fill emptied receiving spaces 5 of a workpiece carrier T with defect-free pipette tips 4.

The holding element 7 is guided within the guide tube 6 and serves to load the respective magazine space 3 with a defect-free pipette tip 4. The loading process only proceeds according to the present exemplary embodiment when all magazine spaces 3 are empty. All the guide tubes 6 are simultaneously loaded with new defect-free pipette tips 4.

Specific functions of the holding elements 7, which are provided for firmly holding and delivering a pipette tip 4, are explained below with reference to FIGS. 3 and 4.

Firstly, FIG. 1 shows further details, specifically a coupling element 8 which can be moved upward and downward. All the holding elements 7 are fastened to the coupling element 8 and can be moved upward and downward together therewith. A lifting device 9, driven by a lifting cylinder 10, is provided for the up and down movement or raising and lowering movement of the coupling element 8. It is additionally provided with a lifting guide 11 which in the present exemplary embodiment has two linear shafts 12 and 13, each of which has a linear bearing arrangement 14 or 15 displaceable thereon. The coupling element 8 is connected to the linear bearing arrangements 14/15 and can in this way be guided upward and downward along the linear shafts 12/13. A connecting element 16, bearing the lifting cylinder 10 and to which the linear shafts 12 and 13 are also fastened, is arranged laterally on the refill magazine 2. The lifting cylinder 10 has a piston rod 17. Because of the required stroke, the lifting cylinder is dimensioned such that its piston rod 17 cannot be directly mounted on the coupling element 8, but is instead fastened to a bridge 18 above the coupling element 8. In turn, each end of the bridge 18 has a spacer pin 19 and 20, respectively, connecting the bridge to the coupling element 8. FIG. 1 shows the lifting cylinder 10 in the retracted state of the piston rod 17. The coupling element 8 assumes its lowest position, as a result of which the free ends of the holding elements 7 can be seen at the bottom by the opening of the guide tubes 6, where they protrude slightly from the respective guide tube 6. The provided pipette tips are thus centered and the holding element 7 can grasp a new pipette tip 4 in a centered manner.

FIG. 2 shows the same part of the handling device 1 as FIG. 1, but the lifting cylinder 10 is now shown in its advanced state with advanced piston rod 17. As a result, the coupling element 8 is moved upward and assumes its highest position. The two displaceable linear bearing arrangements 14 and 15 have guided the movement exactly upward on the respective linear shaft 12 or 13. At the same time, the holding elements 7 have moved upward in the guide tubes 6. The pipette tip 4 from FIG. 1 is entirely within the guide tube 6 and is no longer visible from the outside. It has reached its storage position in the magazine space 3 of the refill magazine 2.

Next, FIG. 3 shows the handling device 1 in the same storage position as in FIG. 2, in this case as a sectional representation. A row of the guide tubes 6 are visible in section, as are the holding elements 7 located therein. The holding elements 7 are shown in their upwardly moved position within the respective guide tube 6, i.e., in the storage position.

Each holding element 7 has substantially three functions. One function is the already mentioned upward and downward mobility within the guide tube 6. A further function is firmly holding a workpiece, such as the pipette tip 4. In the present exemplary embodiment, each holding element 7 has a suction nozzle 19 for firmly holding the workpiece. The suction nozzles 19 of all the holding elements 7 in the same row are connected to a common suction line 20 (common rail principle), which is considered a simple solution. Alternatively, suction nozzles can also be connected via individual suction lines or, combined into groups, via a plurality of suction lines. The common rail principle in the present example means all the magazine spaces 3 in this row can be loaded simultaneously. A control device C is provided which controls switching on and off of the suction line 20 for this purpose.

The suction nozzles 19 of the holding elements 7 are of annular construction. They have an annular gap 21 and are arranged coaxially around a central compressed air nozzle 22, as is most clearly visible in the magnified portion according to FIG. 4. The central compressed air nozzle 22 is part of the acceleration device V, with which a workpiece, such as the pipette tip 4, stored in the magazine space 3 can be ejected from the guide tube 6. The holding element 7 shown in FIG. 4 is moved in its entirety with the firmly held pipette tip 4 into the guide tube 6. The pipette tip 4 and the holding element 7 are accordingly located in the storage position.

Each compressed air nozzle 22 is connected to a compressed air supply (not shown). A pneumatic switching valve 23 is in each case arranged between the compressed air supply and the compressed air nozzle 22. By opening and closing the switching valve 23, a compressed air pulse can impart momentum to the workpiece which propels it out of the guide tube 6. Unlike the suction nozzles 19, the central compressed air nozzles 22 are all separately drivable, because each compressed air nozzle is associated with a dedicated switching valve 23 which can be individually actuated independently of the switching valves of the other compressed air nozzles. The control device C is likewise provided for actuating the switching valves 23. If the refill magazine 2 is still full and a pipette tip 4 is to be shot out, the negative pressure still prevails in the suction line 25 and the suction nozzles and the suction nozzles 19 firmly hold the remaining pipette tips by negative pressure. In the case of the pipette tip which is to be shot out, the compressed air pulse released by the switching valve must therefore work against the negative pressure in the relevant suction nozzle 19 in order to be able to reliably propel the pipette tip out. The pressure and duration of the compressed air pulse are therefore adjusted accordingly. The compressed air supply may be a common compressed air supply, as in the present exemplary embodiment.

Finally, FIGS. 5 and 6 show an example of a removal station 25, with which defective workpieces such as pipette tips or beakers can be removed from a workpiece carrier T, so that receiving spaces 5 of the workpiece carrier T which have become empty can be reloaded with new defect-free workpieces/pipette tips.

The removal station 25 has a passage region 26 for a workpiece carrier T. The workpiece carrier T has a defined grid arrangement, which is in principle arbitrary, and in the present example is provided with 8×8 receiving spaces 5 for workpieces. FIG. 5 shows a cross-section of the passage region 26, in which a workpiece carrier T is located. A lifting aid 27, which serves to lift defective workpieces out of the workpiece carrier T, is arranged beneath the passage region 26. Above the passage region 26 are a plurality of disposal lines 28, which serve to convey away the lifted-out defective workpieces.

The lifting aid 27 of FIG. 5 comprises a plurality of compressed air nozzles 29 which are arranged in a row. Their number corresponds to the number of receiving spaces 5 in a row of the workpiece carrier T shown, specifically as viewed in the depicted section plane. The workpiece carrier T comprises eight rows one behind the other, each with eight receiving spaces per row. When the workpiece carrier T is conveyed through the passage region 26 of the removal station 25, each individual receiving space 5 passes one of the compressed air nozzles 29.

As is most clearly seen from the magnified portion of FIG. 6, each compressed air nozzle 29 is actuated using the control device C and a switching valve 30. The compressed air nozzle is always actuated at the correct time when a defective workpiece arrives and is located in such close alignment with the compressed air nozzle 29 that a compressed air pulse can reliably lift the workpiece out from its receiving space 5 and reliably transfer it into the disposal line 28 above the compressed air nozzle 29. The disposal process is further assisted by a negative pressure relative to the air pressure of the surrounding atmosphere being generated in the disposal line 28. The negative pressure may be provided permanently or the control device C switches on the negative pressure in the disposal line 28 only as required when a defective workpiece arrives at the point at which the disposal line 28 and the compressed air nozzle 29 are aligned.

LIST OF REFERENCE SKINS

1 Handling device
2 Refill magazine
3 Magazine space
4 Pipette tip
5 Receiving space
6 Guide tube
7 Holding elements
8 Coupling element
9 Lifting device
10 Lifting cylinder
11 Lifting guide
12 Linear shaft
13 Linear shaft
14 Linear bearing arrangement
15 Linear bearing arrangement
16 Connecting element
17 Piston rod
18 Bridge
19 Suction nozzle
20 Suction line
21 Annular gap
22 Compressed air nozzle
23 Pneumatic switching valve
25 Removal station
26 Passage region
27 Lifting aid
28 Disposal line
29 Compressed air nozzle
30 Switching valve
C Control device
R1 Row
R2 Row
T Workpiece carrier
V Acceleration device

The invention claimed is:

1. A handling device (1) for tubular or elongate bowl-shaped workpieces, wherein these workpieces are conveyed or conveyable on a workpiece carrier (T) during their production up until packaging, wherein the workpiece carrier (T) has workpiece receiving spaces (5) arranged in a grid relative to one another, such that defective workpieces located on the workpiece carrier (T) are detectable, and a removal station (25) is provided, with which the defective workpieces can be removed from the receiving spaces (5) of a workpiece carrier (T), such that receiving spaces (5) are vacated, wherein vacated receiving spaces (5) of the workpiece carrier (T) can be loaded with defect-free workpieces using the handling device, the handling device comprises a refill magazine (2) which has magazine spaces (3) arranged adjacent one another, each magazine space having:

a holding element (7) which can be moved up and down and serves to firmly hold and to receive and deliver a defect-free workpiece in each case, a guide tube (6), wherein the holding element (7) is guided within the guide tube (6), wherein the holding element (7) is movable up and down within the guide tube (6), and wherein the holding element (7) is movable between an extended position, in which the holding element (7) partially protrudes out of the guide tube (6) for gripping the workpiece, and a retracted position, in which the holding element (7) together with a firmly held workpiece is completely received within the guide tube (6) for storing the workpiece, and an acceleration device (V) provided within the guide tube (6), with which the workpiece can be accelerated out of the guide tube (6) and can be moved to a receiving space (5) of the workpiece carrier (T).

2. The handling device (1) according to claim 1, wherein each acceleration device (V) includes a spring pressure element or a compressed air nozzle (22), such that when the holding element (7) is moved into the guide tube (6) a force pulse can be transferred onto the workpiece using the acceleration device (V).

3. The handling device according to claim 2 with a compressed air nozzle for each holding element,
wherein a compressed air supply is provided together with a pneumatic switching valve (23) in order to impart momentum to the workpiece by compressed air pulse.

4. The handling device according to claim 1, wherein each raisable and lowerable holding element (7) includes an additional suction nozzle (19), with which the refill magazine (2) can be loaded with defect-free workpieces.

5. The handling device according to claim 4, wherein the suction nozzles (19) are connected to a plurality of the raisable and lowerable holding elements (7) via a common suction line (20).

6. The handling device according to claim 5, further comprising a control device (C) via which the common suction line (20) for the suction nozzles (19) can be switched on when the coupling element (8) assumes a lowered position, and in that the compressed air nozzles (22) are individually actuatable using the control device (C).

7. The handling device according to claim 4, wherein the compressed air nozzle (22) and the suction nozzle (19) are in each case arranged coaxially on the raisable and lowerable holding element (7).

8. The handling device according to claim 1, further comprising a lifting device (9) with which at least one of the raisable and lowerable holding elements (7) can be moved upward and downward.

9. The handling device according to claim 8, wherein the lifting device (9) includes a raisable and lowerable coupling element (8) and in that a plurality or all of the raisable and lowerable holding elements (7) are connected to the coupling element (8).

10. The handling device according to claim 9, wherein the lifting device (9) includes a lifting guide (11) for the raisable and lowerable coupling element (8) together with a lifting cylinder (10) for driving the raising and lowering movement of the coupling element (8).

11. The handling device (1) according to claim 1 having the removal station (25) comprising
- a lifting aid (27) for lifting defective workpieces out of the workpiece carrier (T); and
- a disposal line (28) for conveying away lifted-out defective workpieces through the disposal line, and
- wherein workpieces lifted out using the lifting aid (27) pass into the disposal line (28), and
- wherein a passage region (26) for the workpiece carrier (T) is provided between the disposal line (28) and the lifting aid (27).

12. A method for handling tubular or elongate bowl-shaped workpieces using the handling device (1) according to claim 1 and/or using the removal station (25) comprising
- a lifting aid (27) for lifting defective workpieces out of the workpiece carrier (T); and
- a disposal line (28) for conveying away lifted-out defective workpieces through the disposal line, and
- wherein workpieces lifted out using the lifting aid (27) pass into the disposal line (28), and
- wherein a passage region (26) for the workpiece carrier (T) is provided between the disposal line (28) and the lifting aid (27).

13. A removal station (25) for defective tubular or bowl-shaped workpieces comprising at least one workpiece carrier (T) with upwardly open receiving spaces arranged in a grid for the workpieces, the removal station comprising:
- a lifting aid (27) for lifting defective workpieces out of the workpiece carrier (T); and
- a disposal line (28) for conveying away lifted-out defective workpieces through the disposal line, and
- wherein workpieces lifted out using the lifting aid (27) pass into the disposal line (28), and
- wherein a passage region (26) for the workpiece carrier (T) is provided between the disposal line (28) and the lifting aid (27).

14. The removal station (25) according to claim 13, wherein the lifting aid (27) includes at least one compressed air nozzle (29), with which a defective workpiece can be lifted out of the receiving space (5) of the workpiece carrier (T) using a compressed air pulse, in that a negative pressure relative to the air pressure of the surrounding atmosphere can be generated in the disposal line (28), and in that a lifted-out defective workpiece can be sucked up into the disposal line (28) and conveyed away by the negative pressure.

* * * * *